Dec. 22, 1964    E. J. BARUSCH    3,162,211
COMBINATION LINE PENETRATING VALVE DEVICE
Filed Dec. 27, 1960    2 Sheets-Sheet 1
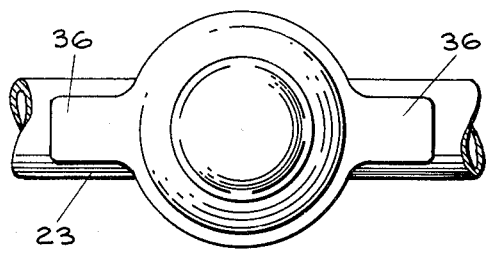
FIG. 3
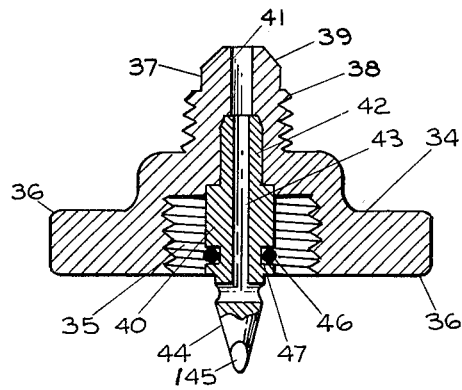
FIG. 10
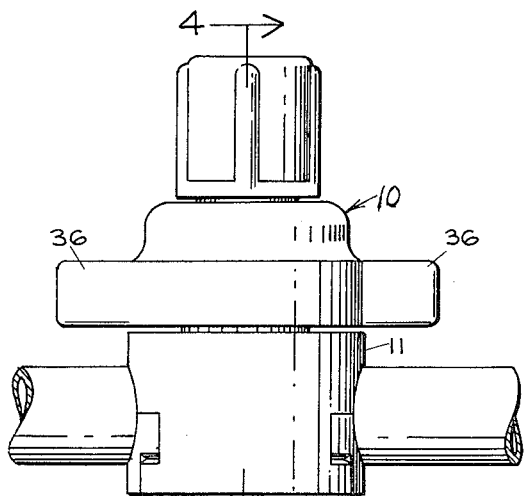
FIG. 1
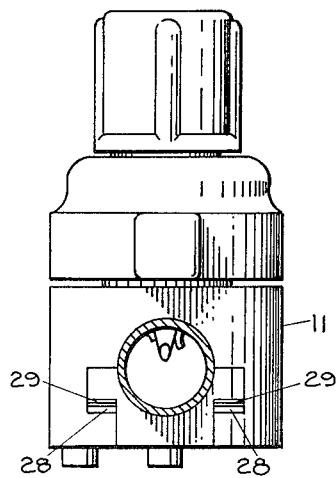
FIG. 2
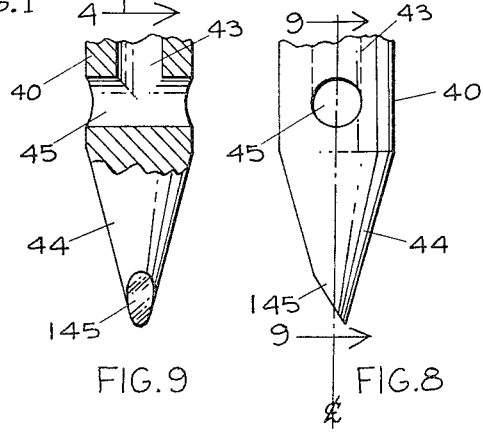
FIG. 9
FIG. 8
INVENTOR.
EDWARD J. BARUSCH
BY
Salvatore G. Militano
attorney Dec. 22, 1964    E. J. BARUSCH    3,162,211
COMBINATION LINE PENETRATING VALVE DEVICE
Filed Dec. 27, 1960    2 Sheets-Sheet 2

*INVENTOR.*
EDWARD J. BARUSCH
BY
*Salvatore G. Militana*
*attorney*

United States Patent Office 3,162,211
Patented Dec. 22, 1964

3,162,211
COMBINATION LINE PENETRATING
VALVE DEVICE
Edward J. Barusch, 504 Ponce de Leon Blvd.,
Coral Gables, Fla.
Filed Dec. 27, 1960, Ser. No. 78,626
7 Claims. (Cl. 137—318)

This invention relates generally to valves and is more particularly directed to a device capable of penetrating a line or tubing and useful as a valve for controlling the flow of fluid through the opening cut in the tubing.

A principal object of the present invention is to provide a combination line penetrating valve device with a cutting needle which cuts an opening in the line or tubing and swages a seat thereon to control the flow of fluids therethrough.

Another object of the present invention is to provide a combination line penetrating valve device with a slide fastening member for securing the device to the line or tubing with ease and without any danger of the slide member becoming loosened or inadvertently removed therefrom.

Another object of the present invention is to provide a combination line penetrating valve device having a minimum of parts, inexpensive in cost of manufacture, simple in operation and requiring no tools for the actuation of the valve.

A further object of the present invention is to provide a combination line penetrating valve device with a cutting needle which when first rotated makes a spiral cut in the wall of the tubing and then swages a seat on the wall of the tubing without severing the spirally cut material or affecting the efficiency of the valve to control the flow of fluid therethrough.

A still further object of the present invention is to provide a combination line penetrating valve device with an adapter to permit use of the device in connection with lines or tubing of various sizes.

A still further object of the present invention is to provide a combination line penetrating valve device which is rendered leakproof by virtue of the simplicity of the construction of the device and the effective use of a plurality of seals and valves in connection therewith.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a side elevational view of my line piercing valve.

FIGURE 2 is a front elevational view thereof.

FIGURE 3 is a top plan view thereof.

FIGURE 8 is a fragmentary side elevational view of the line piercing valve member.

FIGURE 9 is a cross sectional view taken along the line 9—9 of FIGURE 8.

FIGURE 10 is a cross sectional view of my valve supporting cap.

Figure 4:
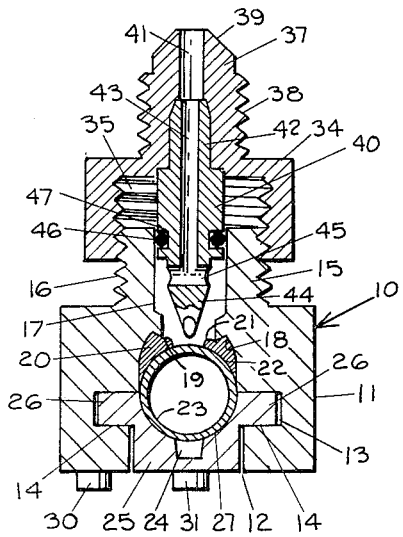
FIGURE 4 is a cross sectional view taken along the line 4—4 of FIGURE 1.
Figure 5:
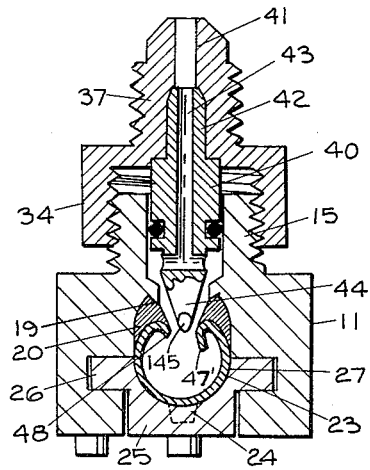
FIGURE 5 is a similar view showing a line after having been pierced with a valve in the open position.

Referring to the drawings wherein like numerals are used to designate similar parts throughout the several views, the numeral 10 refers to my line penetrating valve device consisting of a main body member 11 having a cylindrical shape for the purpose of convenience, although any other shape of the body member 11 would not diminish the efficiency attained during the normal use of the device 10. The main body member 11 is slotted along its full length at its lower portion as at 12 with a wider rectangular slot 13 above and adjoining the slot 12 to form a pair of spaced apart shoulders 14 in the main body member 11.

Mounted on the main body member 11 and cast integrally therewith is an upwardly extending neck portion 15 threaded on its outer surface as at 16. A centrally disposed bore 17 extends along the neck portion 15 and communicates with an approximately hemispherical shaped chamber 18 the lower portion of which opens into the slot 13. At the top portion of the chamber 18 there is a peripherally disposed ridge 19 extending in a downwardly position. Mounted in the chamber 18 is a rubber or plastic seal 20 conformed to fit in the chamber 18 and engaging the ridge portion 19. The seal 20 is provided with a conical bore 21 and a cylindrically shaped bottom wall 22 for engaging the outside surface of a pipe or tubing 23 as is explained in greater detail hereinafter.

Figure 7:
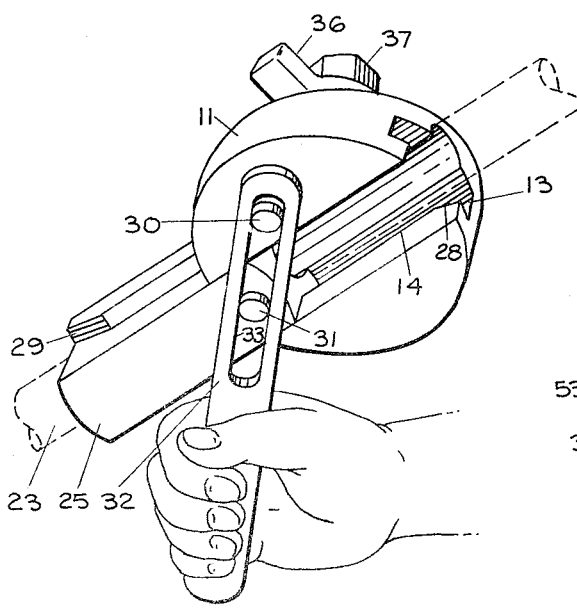
FIGURE 7 is a perspective view showing the manner by which my line piercing valve is mounted on the tubing or pipe line.

Means are provided for maintaining the pipe or tubing 23 secured in position in the main body member 11 comprising a slide member 25 which fits snugly in the slotted portion 12 with arm portions 26 fitting snugly in the slotted portion 13 and abutting against the shoulders 14. The slide member 25 is provided with a longitudinally disposed semi-cylindrical slot or groove 27 at its upper portion for receiving and supporting the tubing 23. In order to permit the slide member 25 to be readily received by the slots 12 and 13 in the main body member 11 the shoulders 14 as well as the ends of the arm portions 26 of the slide member 25 are provided with inclined portions 28 and 29 respectively at each end thereof. A boss 30 is mounted on the lower surface and at one side of the main body member 11 while a second similar boss 31 is mounted on the lower surface of the slide member 25. A tool 32 provided with an elongated slot 33 is used to slide the slide member 25 into place in the main body member 11 as best shown by FIGURE 7. The slide member 25 is provided with a centrally disposed bore 24 communicating with the slot 27.

The tubing penetrating mechanism consists of a cap 34 threaded at its inner portion as at 35 threadedly mounted on the neck portion 15 of the main body member 11. The cap 34 is provided with a pair of oppositely extending wing portions 36 for facilitating the manual threading of the cap 34 on and off the neck portion 15. Extending centrally and upwardly of the cap 34 is a neck portion 37 whose outside surface is threaded as at 38 for receiving a coupling of a pipe line (not shown) when connecting the penetrating valve device 10 to a source of gas, etc. The upper surface 39 which is tapered as shown forms a gastight seal between the connecting pipe and the device 10.

Secured to the cap 34 is a cutting needle 40 whose upper shank portion 42 is force-fitted into a centrally disposed bore 41 in the cap 34 to thereby become integral therewith. The needle 40 is provided with an axially disposed fluid passageway 43 which extends from the top portion of the needle 40 to a position adjacent its cutting end 44 where the passageway 43 communicates with a laterally extending passageway 45. A hollow ground cutting surface 145 which is provided on the cutting end portion 44 of the needle 40 permits the cutting needle 40 to cut rather than pierce the tubing 23 as is explained in detail hereinafter. An O-ring seal 46 is positioned in a peripheral slot 47 and abuts against the side wall of the bore 17 of the main body member 11 to prevent the escape of gas therealong.

In the normal operation of the tubing penetrating valve device 10, the slide member 25 is removed from the main body member 11 and the latter is placed on the tubing 23 at the approximate position where it is desired to penetrate the tubing 23. The slide member 25 is then aligned with the slotted portions 12 and 13 of the main body member 11 with the inclined portion 29 of the slide member 25 received by the inclined portion 28 of the shoulder 14. Then the tool 32 is placed on lower surface of the device 10 with the bosses 30 and 31 being received by the slot 33 as shown by FIGURE 7. By swinging the tool 32 about the boss 30 as a pivot, the slide member 25 will be forced to slide along the slots 12 and 13 until the ends of the slide member 25 become aligned with the peripheral edges of the main body member. The seal 20 becomes tightly compressed in the chamber 18 and the sharp ridge 19 prevents any movement of the seal. The operator then grasps the wing portions 36 and rotates same to cause the needle supporting cap 34 to thread downwardly on the neck portion 15 and the cutting edge 44 of the needle 40 to approach the tubing 23. As the wing portions 36 are continued to be rotated, the cutting edge 145 will simultaneously cut into the wall of the tubing 23, that is, rotate as it moves downwardly into the inner portion of the tubing 23. This results in effecting a spiral cut in the side wall of the tubing 23. As soon as the cutting edge 145 has passed the position of the side wall of the tubing 23 and entered the inner portion of the tubing 23, the cutting action is completed and a swaging action now occurs. The increasing size of the needle tip 44 causes the cut edge of the tubing to be rolled or swaged downwardly and inwardly as shown to form a smooth and even seat for the needle tip 44 which also operates as a valve. The cut portion 47' of the tubing 23 remains affixed to the tubing 23 and cannot clog or block the passageways of the device 10.

The cutting needle 40 is now backed off the tubing 23 by reversing the rotational force on the wing portions 36. Fluid under pressure will now flow from the tubing 23 through the opening 48 cut in tubing 23, into the transverse ports 45, into the longitudinal passageway 43 and into the conduit (not shown) connected to neck portion 37. The O-ring seal 46 will prevent any leakage between the side wall of the bore 17 and the outer wall of the cutting needle body 40. Also, fluid under pressure can be made to flow from a source of fluid under pressure such as a tank of gas (not shown) into the bore 40 of the neck portion 37, past the needle tip 44 and through the cut opening 48 into the tubing 23.

When it is desired to close off the cut opening 48 in the tubing 23, the wing portions 36 are again rotated to thread the cap 34 downwardly on the neck portion 15 of the main body member 11. The needle tip 44 will rotate and move downwardly in the direction of the opening 48 until the conical side walls of the needle tip 44 will simultaneously engage the rubber seal 20 and the swaged tubing at the rim of the opening 48 and seals itself evenly thereon. All flow of fluid under pressure past the opening 48 will now cease.

Figure 6:
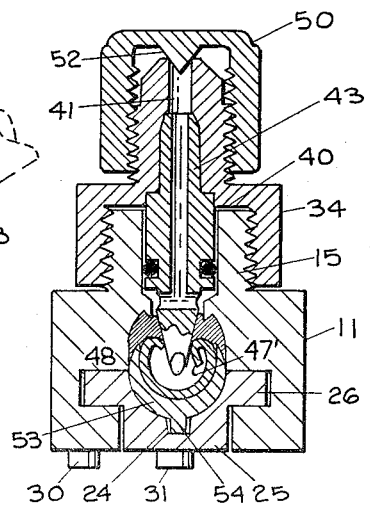
FIGURE 6 is a similar view showing the piercing of a smaller line by the use of an adapter and with the valve shown in its closed position.

To prevent any dust, etc. from entering the bore 41 and also to operate as a valve to prevent any loss of gas that may have occurred at the needle tip 44 from escaping to the atmosphere, a cap 50 is provided with internal threads 51 which engage the threads 38 of the neck portion 37. Depending from the inner surface of the cap 50 there is a conical valve head 52 which engages the outer end of the bore 41 to close off the passageway as best shown by FIGURE 6. A firm twist of the cap 50 will cause the conical valve seat 52 to engage the top edge of the bore 41 so that no gas, moisture or dust may flow either inwardly or outwardly of the device 10.

As best shown by FIGURE 6, my line penetrating valve device 10 may be used for penetrating lines or tubing 23 of various sizes. To accomplish this, an adapter 53 must be utilized. The adapter 53 is provided with an arcuate outside surface received by the semi-cylindrical slot 27 of the slide member 25 while its upper surface receives the smaller sized tubing. A boss 54 mounted on the lower surface of the adapter 53 is fitted into the bore 24 in the slide member 25 for securing the adapter 53 in position. My line penetrating valve 10 as modified by the application of the adapter 53 operates in precisely the same manner as described above without the use of the adapter 53.

What I claim as new and desire to secure by Letters Patent of the United States is:

1. A combination line penetrating valve device comprising a main body member, a threaded neck portion extending upwardly of said main body member, said main body member having a pair of substantially rectangular and contiguous slots extending across the bottom portion of said main body member, the uppermost of said slots being larger than the other thereby forming a pair of shoulders, said main body member having a substantially semi-cylindrical slotted portion formed therein and communicating with said upper rectangular slot, a fluid passageway in said threaded neck portion communicating with said semi-cylindrical slotted portion, said main body member having a peripheral depending ridge portion formed therein at the juncture of said fluid passageway and said semi-cylindrical slotted portion, flexible seal means mounted in said semi-cylindrical slotted portion and engaging said depending ridge portion, said flexible seal means having an opening in alignment with said fluid passageway, a needle supporting member threadedly mounted on said neck portion, a pair of oppositely extending wing portions mounted on said needle supporting member for manipulating said needle supporting member, said needle supporting member having a threaded neck portion and a bore in axial alignment with said fluid passageway, a penetrating needle having a body portion, a shank portion and a penetrating tip portion, said shank portion being secured in said bore, said body portion of said penetrating needle received in said fluid passageway, said penetrating tip portion extending into said opening in said flexible seal means, said body portion having a peripheral slot, an O-ring seal mounted in said peripheral slot and engaging the side wall of said fluid passageway for sealing the juncture thereof, said pentrating needle having a longitudinal bore extending along said shank portion, said needle body portion and terminating adjacent said penetrating tip portion, a transversely disposed bore at said tip portion communicating with the lower end of said longitudinal bore whereby communication is effected between said fluid passageway and said bore in said needle support member, a slide member having a substantially similar configuration as said pair of substantially rectangular slots slidably mounted in said pair of slots, said slide member having a substantially semi-cylindrical slotted portion oppositely disposed to said first named semi-cylindrical slotted portion in said main body member and a boss mounted on a bottom surface on each of said body member and said slide member for receiving a tool to position said slide member in said body member.

2. The structure as recited by claim 1 taken in combination with a cap member threadedly mounted on said neck portion of said needle supporting member, a conical shaped valve head mounted in said cap member in axial alignment with said bore in said needle supporting member whereby upon the threading of said cap member on said neck portion, said valve head engages said bore and prevents the escape of fluid therealong.

3. The structure as recited by claim 1 wherein said penetrating tip portion of said needle comprises a substantially conical shaped member and having a substantially oval cutting edge whereby upon the threading of said needle support member down on said main body member, the simultaneous lateral and rotational movement of said penetrating needle forms a spiral cut on said line.

4. The structure as recited by claim 1 wherein said slide member is provided with an inclined surface at each end thereof and said pair of shoulders are provided with substantially identically inclined surface whereby said slide member is readily inserted into said slots of said main body member.

5. A combination line penetrating valve device comprising a main body member having a slotted portion for receiving a line to be penetrated, means for securing said main body member to said line, said main body member having a fluid passageway communicating with said slotted portion, annular sealing means mounted in said slotted portion at one end of said fluid passageway adapted to engage said line, line penetrating support means threadedly mounted on said main body member, said line penetrating support means having a bore, line penetrating means having a body portion secured at one end to said line penetrating support means and a conical head portion mounted at the other end extending into said fluid passageway in proximity of said annular sealing means, a substantially oval cutting edge portion mounted at the free end of said conical head portion, said body portion of said line penetrating means having a fluid duct communicating with said bore at said one end and with said fluid passageway in proximity of said conical head portion whereby upon the threading of said support means on said main body member said line penetrating means engages said line, said oval cutting edge portion cuts into said line and said conical head portion seats on said opening cut in said line and said annular sealing means to prevent escape of fluid from said line and upon the reverse rotation of said support means on said main body member said conical head portion is withdrawn from said opening cut in said lines and fluid will flow into said fluid passageway, through said duct and into said bore of said line penetrating support means.

6. A combination line penetrating valve device comprising a main body having a slotted portion for receiving a line to be penetrated, means for securing said main body member to said line, said main body member having a fluid passageway communicating with said slotted portion, annular sealing means mounted in said slotted portion at one end of said fluid passageway adapted to engage said line, line penetrating support means threadedly mounted on said main body member, said line penetrating support means having a bore, a line penetrating means having a body portion secured at one end to said line penetrating support means and a conical head portion mounted at the other end extending into said fluid passageway in proximity of said annular sealing means, a substantially oval cutting edge portion mounted at the free end of said conical head portion, said body portion of said line penetrating means having a longitudinally disposed fluid duct communicating with said bore at said one end and with a transversely disposed fluid duct at said other end in proximity of said conical head, whereby upon the threading of said support means on said main body member said line penetrating means engages said line, said oval cutting edge portion cuts into said line and said conical head portion seats on said opening cut in said line and said annular sealing means to prevent escape of fluid from said line and upon the reverse rotation of said support means on said main body member said conical head portion is withdrawn from said opening cut in said line and fluid will flow into said fluid passageway, through said duct and into said bore of said line penetrating support means.

7. A combination line penetrating valve device comprising a main body member, a threaded neck portion extending upwardly at one end of said main body member, said main body member having a slotted portion at the other end for receiving a line to be penetrated, means for securing said main body member to said line, annular sealing means mounted in said slotted portion adapted to engage said line, said main body member having a fluid passageway communicating with said slotted portion at said annular sealing means, a needle supporting cap threadedly mounted on said neck portion of said main body member, said cap having a bore, a line penetrating body member secured to said cap at said bore and extending in said fluid passageway, said line penetrating body member having a passageway communicating with said bore at one end and with said main body fluid passageway adjacent the other end, a conical head member mounted on said line penetrating body member at said other end in proximity of said annular sealing means, said conical head member having an oval shaped cutting edge at its free end whereby upon the threading of said cap on said neck portion of said main body member, said cutting edge will cut and penetrate said line and said conical head member will seat on said formed opening in said line to seal said opening.

References Cited in the file of this patent

UNITED STATES PATENTS

| 1,812,907 | Tell | July 7, 1931 |
| 2,254,102 | Cruse | Aug. 26, 1941 |
| 2,608,989 | McDonald | Sept. 2, 1952 |
| 2,827,913 | Wagner | Mar. 25, 1958 |
| 2,950,637 | Merrill | Aug. 30, 1960 |

FOREIGN PATENTS

| 8,272 | Great Britain | 1894 |
| 324,074 | Switzerland | 1957 |